United States Patent [19]
Merchel

[11] Patent Number: 5,655,395
[45] Date of Patent: Aug. 12, 1997

[54] CARD FOR A PLEDGE LOCK

[75] Inventor: Horst Merchel, Bietigheim-Bissingen, Germany

[73] Assignee: Vendoret Holding S. A., Luxembourg-Hesperange, Luxembourg

[21] Appl. No.: 254,294

[22] Filed: Jun. 6, 1994

[30] Foreign Application Priority Data

Jun. 4, 1993 [DE] Germany .......................... 43 18 627.0
Dec. 8, 1993 [DE] Germany .......................... 43 41 791.4

[51] Int. Cl.$^6$ ................................................. E05B 35/04
[52] U.S. Cl. ................. 70/387; 70/405; 70/DIG. 41; 194/905; 235/494
[58] Field of Search ..................... 70/382, 387, 389, 70/393–395, 402, 405, 409, 410, 413, 278, 276, DIG. 17, DIG. 41; 211/4, 9; 194/210, 212, 213, 247, 257, 302, 328, 332, 905; 235/380–383, 440, 487–489, 493, 494

[56] References Cited

U.S. PATENT DOCUMENTS

| | | | |
|---|---|---|---|
| 1,373,112 | 3/1921 | Backus | 211/9 |
| 2,656,707 | 10/1953 | Nilsson | 70/352 |
| 3,093,993 | 6/1963 | Lord | 70/405 X |
| 3,669,211 | 6/1972 | Gilgoff | 70/387 X |
| 4,111,018 | 9/1978 | Pilvet | 70/387 X |
| 4,400,956 | 8/1983 | Martin | 70/394 |
| 4,474,280 | 10/1984 | Lenander | 194/905 X |
| 4,572,348 | 2/1986 | Eisermann et al. | 70/DIG. 41 X |
| 4,576,274 | 3/1986 | Thorsen | 194/210 |
| 4,637,507 | 1/1987 | Ricouard et al. | 70/DIG. 41 X |
| 4,658,612 | 4/1987 | Eisermann | 70/402 |
| 4,669,596 | 6/1987 | Capers et al. | 194/210 |
| 4,766,989 | 8/1988 | Maloeuvre et al. | 194/905 X |
| 4,932,228 | 6/1990 | Eisermann | 70/DIG. 41 X |
| 5,069,324 | 12/1991 | Lepage et al. | 194/905 X |
| 5,199,544 | 4/1993 | Lenander et al. | 194/905 X |
| 5,339,661 | 8/1994 | Eisermann | 70/387 X |
| 5,495,930 | 3/1996 | Lenander et al. | 194/905 X |

FOREIGN PATENT DOCUMENTS

| | | | |
|---|---|---|---|
| 213873 | 3/1987 | European Pat. Off. | 70/402 |
| 545233 | 6/1993 | European Pat. Off. | 194/905 |
| 3242045 | 5/1984 | Germany | 70/387 |
| 3900538 | 7/1990 | Germany | 194/905 |
| 3900582 | 7/1990 | Germany | 194/905 |
| 4125875 | 2/1993 | Germany | 194/905 |
| 4210150 | 9/1993 | Germany | 194/905 |

Primary Examiner—Suzanne Dino
Attorney, Agent, or Firm—Herbert Dubno

[57] ABSTRACT

A pledge-lock cooperates with a pledge card having a deformable portion and a rigid portion such that the deformable portion deforms upon insertion to serve as a check on the card. When a proper card is inserted it actuates the pledge lock to release the cart and retain the card.

16 Claims, 7 Drawing Sheets

CARD FOR A PLEDGE LOCK

FIELD OF THE INVENTION

The invention relates to a card for a pledge lock for shopping or luggage carts to be releasably attached to one another.

BACKGROUND OF THE INVENTION

A card for a pledge lock is disclosed in German Patent Document DE 42 29 332. An important aspect thereof is that the lock does not accept just any card and that the coupling member can be unlocked only by certain cards.

OBJECT OF THE INVENTION

It is an object of the invention so to improve a pledge lock that the coupling member can be unlocked due to the particular shape or design of the simply constructed card.

SUMMARY OF THE INVENTION

This object is attained according to the invention in that a surface zone of the card can be deformed by the lock, a remaining surface zone of the card remains undeformed, and the lock can be actuated or the card checked by the deformed or undeformed surface zone.

The fact that a particular small or large zone of the card can be bent out into another plane means that the lock can be actuated only by a card deformable in this manner. Either the deformed or undeformed zone can unlock the coupling member directly or by intermediate members. However, this can also be the result of the feature that only a correctly designed card can be inserted into the lock so that only upon correct insertion is unlocking possible.

The lock and card are very simply constructed and have small outside dimensions. High functional efficiency and security and simple handling are also achieved as a result.

According to the invention, the deformation of the deformable surface zone is facilitated by a recess, more particularly a slot, which adjoins the deformable surface zone. The recess can be provided in the card edge. Alternatively the two ends of the recess, more particularly the slot, can be at a distance from the card edge. The recess, more particularly the slot, can terminate in a widened portion or can enclose a tongue-shaped surface zone. The slot can be disposed in the direction of the card insertion path.

According to a feature of the invention, disposed at the front edge of the card there are two first zones, more particularly tongues, each of which is separated by a slot from a central, second zone. The central zone can have a greater width than the width of a first zone.

Alternatively the recess, more particularly the slot, can bound one or more teeth. In yet another construction, the recess, more particularly the slot, is zig-zag-shaped. The recess, more particularly the slot can have one or more arches. Deformation of the deformable surface zone can be facilitated by a groove-shaped recess which adjoins the deformable surface one, by a softening of the material or by reduction of its density.

The deformable surface zone consists of a softer material, more particularly rubber, soft plastic and/or paperboard, than the remaining area. The deformable surface zone can be adjoined by an edge zone which consists of a softer material, more particularly rubber, soft plastics and/or paperboard, than the remaining area. Also the deformable surface zone can be adjoined by an edge zone which has a smaller thickness than the remaining area.

Furthermore, the zone movable out of the card surface can move springily.

The invention also is a pledge lock for a card as described for shopping and luggage carts to be releasably attached to one another. The lock has a casing which is attached to the first cart and has an opening for the card and an opening for a coupling member, which is attached to the second cart and kept locked by a closure bolt until the card is inserted. The card during insertion moves a control member which moves the closure bolt out of the locking and into the unlocked position. The card zone actuating the lock can be moved out of the plane of the card and moves the control member directly or via an intermediate member. Only a small deformable surface zone via which the lock is actuatable can be bent out of the plane of the card by the lock.

Alternatively a large zone of the card, more particularly the whole card, can be bent by the lock, and a smaller card zone via which the lock can be actuated remains substantially undeformed. The card also can have a magnetic strip by which items of information can be stored via a read/write apparatus and/or called up, the apparatus being preferably disposed at the check-out or at the entrance/exit of a shop. The card can also have an electronic chip and/or integrated circuit.

BRIEF DESCRIPTION OF THE DRAWING

The above and other objects, features, and advantages will become more readily apparent from the following description, reference being made to the accompanying drawing in which.

SPECIFIC DESCRIPTION

A pledge lock (FIG. 1) has a parallelipipedic casing 1 corresponding in shape and dimensions to substantially twice the size of a matchbox. The casing 1 is closed at the bottom and has four vertical side walls and an internal cavity which is open in the upward direction and closed by a cover 6. The cover 6, attached to the top side, is pressed on from above and retained by lateral detents.

Figure 1:
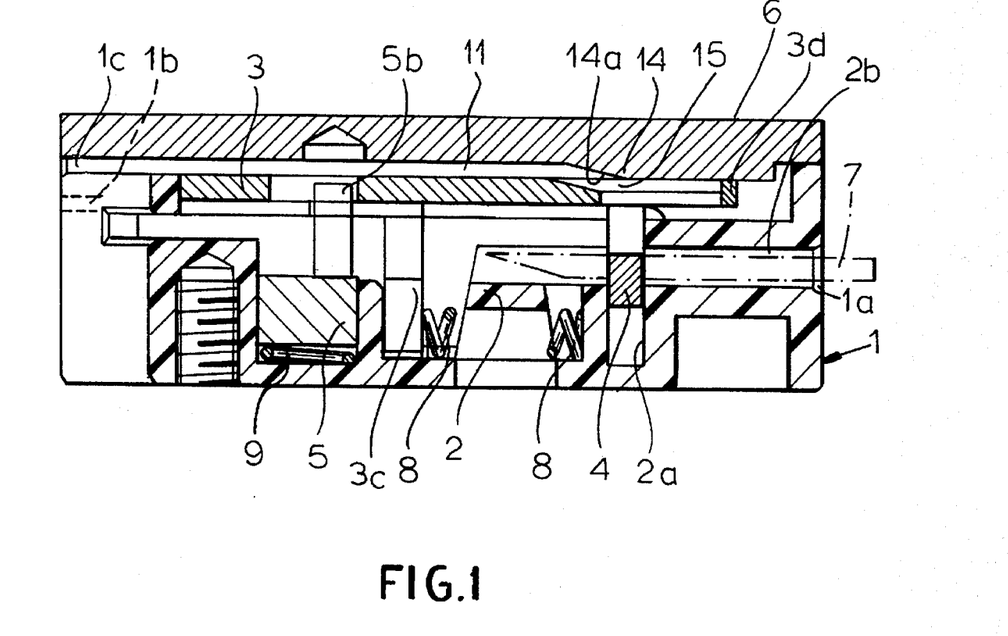
FIG. 1 is a vertical longitudinal section through a pledge lock according to the invention with the coupling member locked.

Attached inside the casing 1, is a bearing block 2 which is connected to the bottom of the casing and over which a slot-shaped control member 3 is pulled which corresponds in cross-section to an inverted U. As a result, the control member 3 engages around the two sides of the bearing block 2 by its two side walls 3a.

The bearing block 2 is formed transversely over the longitudinal direction of the casing 1 with a slot 2a in which a closure bolt 4 is mounted to move vertically. At each of its lateral ends the closure bolt 4 has a pin 4a and a locking member which is disposed therebetween and which performs the locking function for an insertable coupling member 7.

Figure 2:
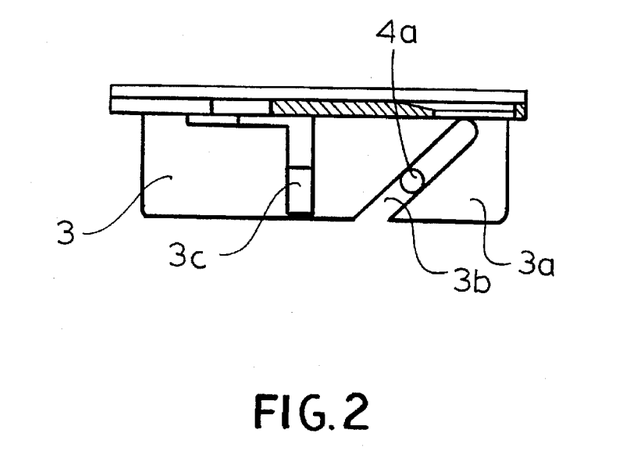
FIG. 2 is a vertical longitudinal section through the control member.

Each of the side walls 3a of the control member 3 is formed with an inclined slot 3b in each of which a pin 4a is disposed. When the control member 3 is moved in the longitudinal direction of the casing, the closure bolt 4 is raised or lowered.

Mounted in the bearing lock 2 is a compression spring 8 which bears against a transverse wall 3c of the control member 3. The compression spring 8 moves the control member 3 in a direction in which the closure bolt 4 is moved through the slots 3b into the position locking the coupling member. The bearing block 2 is formed with a longitudinal channel 2b which corresponds to the cross-section of the coupling member and is inserted by an opening 1a in the front side of the casing 1 of a member, more particularly a cart to be coupled to the coupling member 7 of another cart. The coupling member has a cut back, more particularly an opening. When the coupling member is pushed through the opening 1a into the casing 1, the front wedge-shaped tip of the coupling member displaces the control member 3 against the pressure of the spring 8. When the coupling member has been inserted as far as its end position, its opening reaches the closure bolt 4, which snaps into the opening. The coupling member can then no longer be removed from the lock by force.

Mounted at the end opposite the closure bolt 4 inside the casing 1 is a securing member 5 whose top side has an inclined surface which, when the coupling member is inserted, bears against a front wedge face of the coupling member or its tip. As a result, the tip of the coupling member holds the securing member 5 downwards in its bottom position against the pressure of a compression spring 9 disposed therein.

The end face of the casing 1 opposite the opening 1a has two further openings 1b and 1c. The slot-shaped opening 1b receives as a pledge a coin which, when the securing member 5 is in the bottom position, slides over the top side of the securing member 5 into the casing to such an extent that the coin projects only slightly outwards from the casing, if at all. In this furthest inserted position of the coin it is engaged around by two lateral projections projecting from the top side of a securing member 5, when the coupling member is at least partially drawn downwards and the securing member 5 is in its top position.

On its top side the securing member 5 also has two vertically projecting pins 5b. The pins 5b extend into a longitudinal channel 11 which terminates in the slot-shaped opening 1c. By the opening 1c in the channel 11 a card 10, more particularly in the form of a credit card or a key card, can be horizontally inserted into the lock, and in the end position the holes 10a in the card stand over the pins 5b, so that in the upper position of the securing member 5 the pins 5b lock the card against being pulled out.

Figure 3:
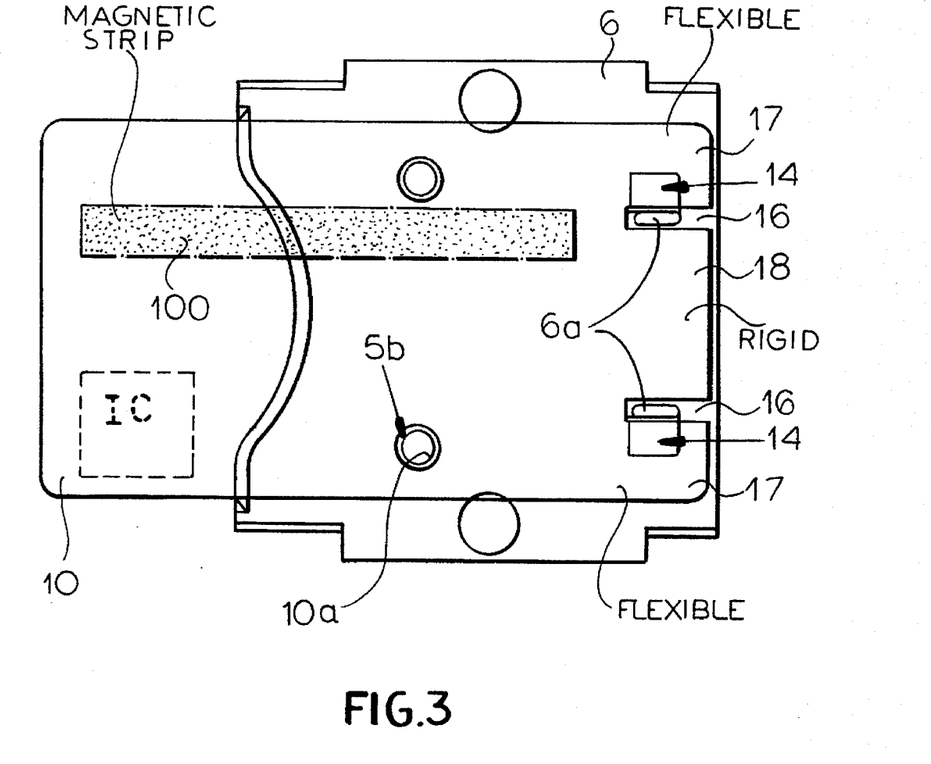
FIG. 3 is a plan view of the cover and card.

The front side of the card 10 is formed with two slots 16 which are arranged in the longitudinal direction of the card and which terminate in the front edge of the card and separate two outer bendable tongues 17 (first zones) from a central card zone 18 (second zone). The slots engage around pins 6a projecting from the underside of the casing cover 6, so that only cards 10 having corresponding slots can be inserted.

Figure 4:
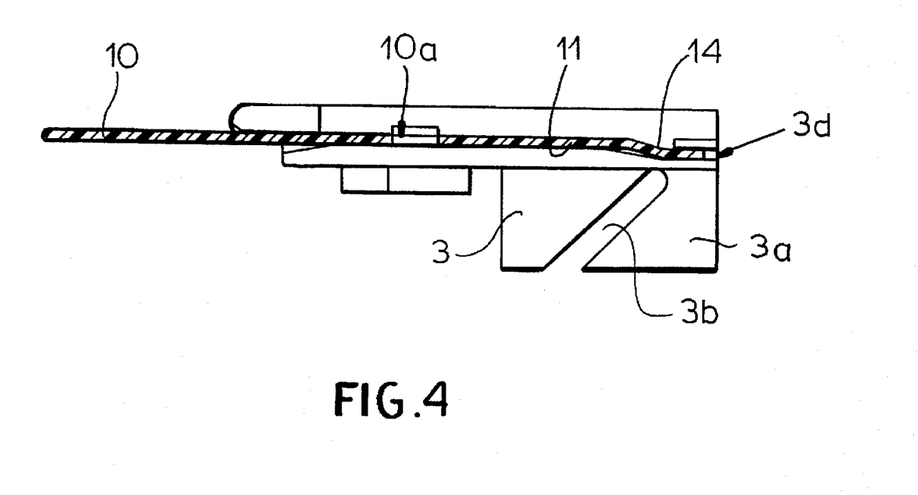
FIG. 4 is a side elevation of cover, card and control member.

When the card 10 is inserted into the channel 11, the two tongues 17 each impinge against inclined surface 14a of a projection 14 formed on the underside of the casing cover 6 and extending from above into the longitudinal channel 11. Disposed in the casing cover 6 are two projections 14 each of which lies in the zone of movement of a tongue 17.

As soon as the tongues 17 slide over the inclined surface 14a, they are bent out downwardly and pass into an opening 15 in the control member 3, to impinge against the edge of the opening 15, which forms stop 3d. As a result, the tongues 17 displace the control member 3.

When the coupling member is inserted into the opening 1a, as described hereinbefore, it is locked in its end position by the closure bolt 4. In this end position the coupling member forces the securing member 5 into its position opening up the longitudinal channel 10 and the coin channel, and the control member 3 is situated in its position where it is adjacent the openings 1b and 1c and into which the control member 3 is forced by the spring 8.

When a coin or a card 10 is inserted in the lock, the coin presses against the transverse wall 3c and the card by its front sides of the tongues 17 against the stop 3d on the control member 3. As a result of the insertion of the coin or card, therefore, the control member 3 is moved away to the right from the openings 1b and 1c against the force of the spring 8. At the same time, via the slots 3b and the pins 4a, the control member 3 moves the closure bolt 4 into its release position, so that the coupling member can be freely drawn out.

FIG. 3 shows the card with two slots which open up at the front edge of the card and form two lateral bendable tongues. The embodiment illustrated in FIG. 5 differs herefrom by the feature that only a longitudinally disposed slot 16 opens in the front edge and separates two tongues 17 from one another. One tongue or the other is bent in dependence of the position in which the card is inserted into the lock—i.e., whether the underside is at the bottom or the top. The rest of the card area 18 remains straight.

Figure 5:
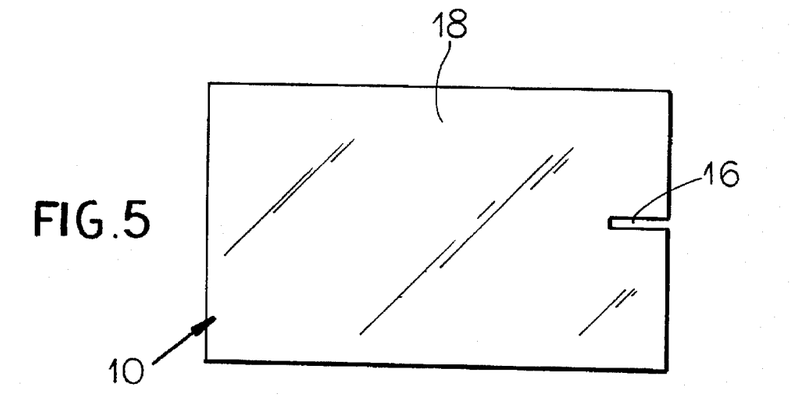
FIG. 5 is a plan view of a card with a forwardly opening slot which separates two tongues from one another.
Figure 6:
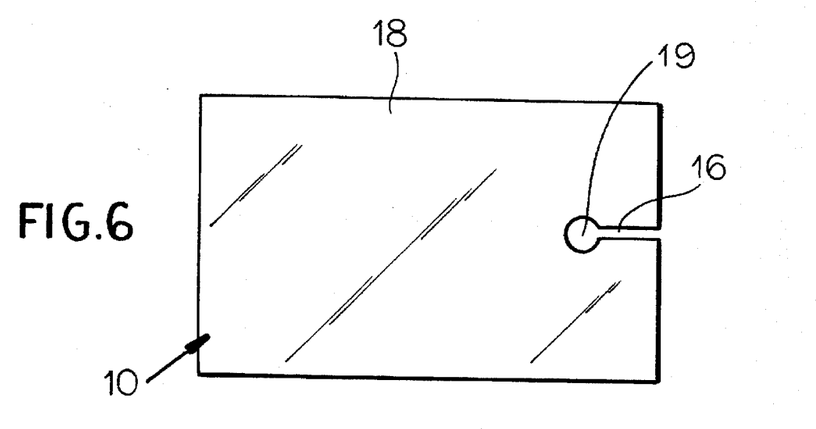
FIG. 6 is a plan view of a card similar to FIG. 5, with a slot terminating in a widened portion.

The embodiment illustrated in FIG. 6 differs from that shown in FIG. 5 only by the feature that the slot 16 terminates in a circular widened portion (recess) 19. This enhances the mobility of the tongues 17.

Figure 7:
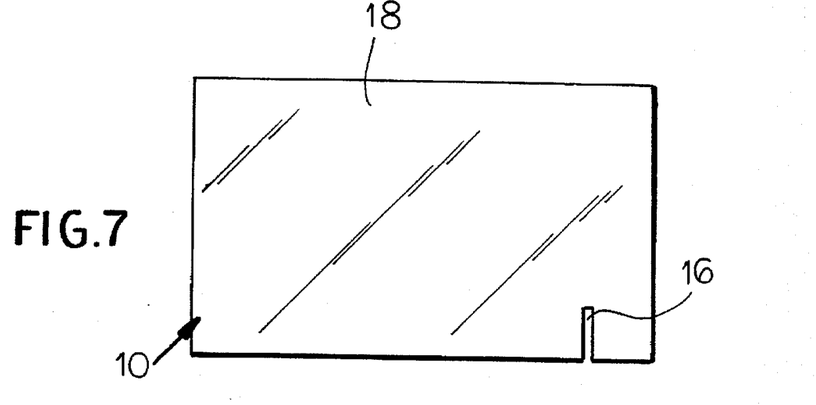
FIG. 7 is a plan view of a card with laterally opening slot which bounds a tongue.

In the embodiment illustrated in FIG. 7 the slot 16 is disposed transversely of the longitudinal direction of the card and in the direction of insertion, so that the slot 16 opens in a longitudinal side of the card. The resulting tongue 17 can move in the same manner as in the preceding embodiments.

Figure 8:
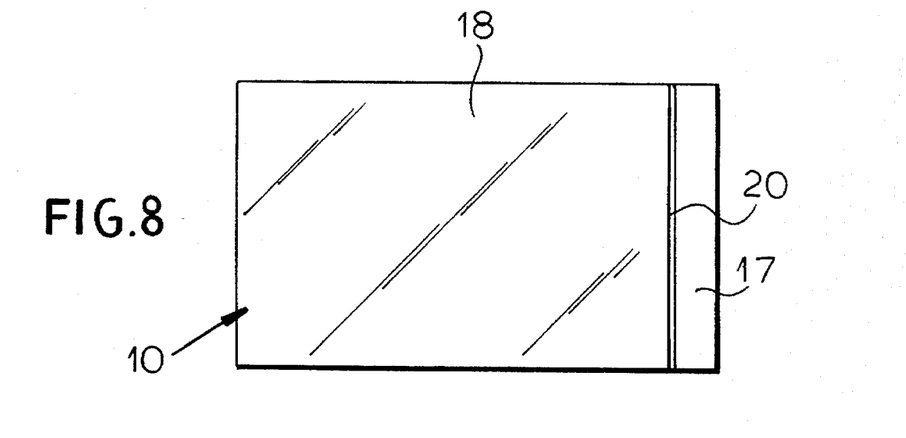
FIG. 8 is a plan view of a card with a deformable surface area divided off by a transverse groove.

The embodiment illustrated in FIG. 8 shows a tongue 17 in the form of a deformable surface zone—i.e., in this case one which can be bent down—, which is divided off from the rest of the card by a transverse groove 20. The transverse groove 20 extends to a reduction of material in the zone of the groove, so that the zone 17 can be readily bent down. The transverse groove 20 can be disposed on one or both sides and more particularly take the form of a film hinge.

Figure 9:
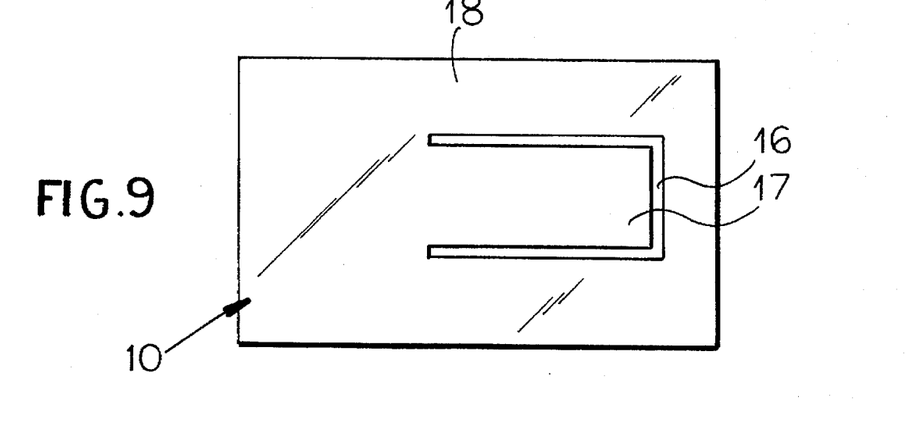
FIG. 9 is a plan view of a card with an internal tongue.

In the embodiment illustrated in FIG. 9 the tongue 17 is disposed in the interior of the card, the slot 16 enclosing the tongue 17 on three sides in U-shape. The tongue lies in the longitudinal direction of the card, the free end being turned towards the introduction side of the card.

When the coupling member is withdrawn, its tip releases the securing member 5, so that it can move upwards and locks the coin and/or the card 10 by the projection 5a and/or the pins 5b. As a result, the coin and/or card remain firmly retained in the pledge lock until the coupling member is again inserted.

Figure 10:
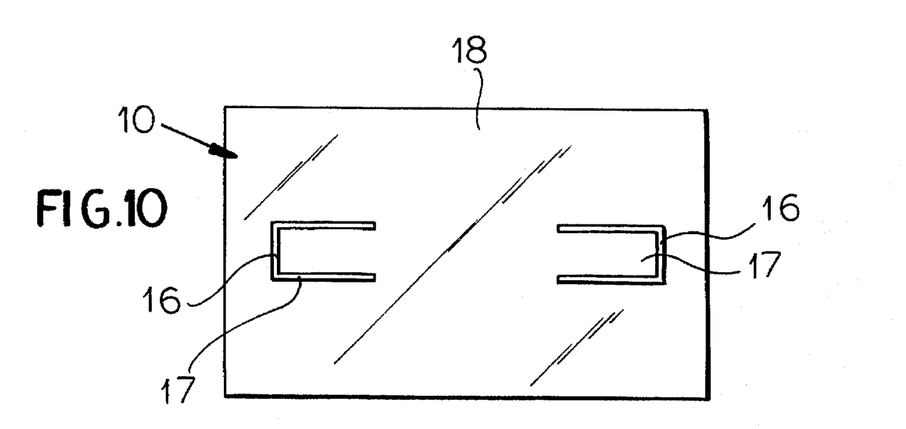
FIG. 10 is a plan view of a card with two internal tongues.

The embodiment illustrated in FIG. 10 differs from that shown in FIG. 9 by the feature that two tongues are disposed inside the card surface, the end of each of the two tongues facing the narrow side of the card, which is closer to the tongue. As a result, the card can be inserted optionally by its two narrow sides in the lock.

Figure 11:
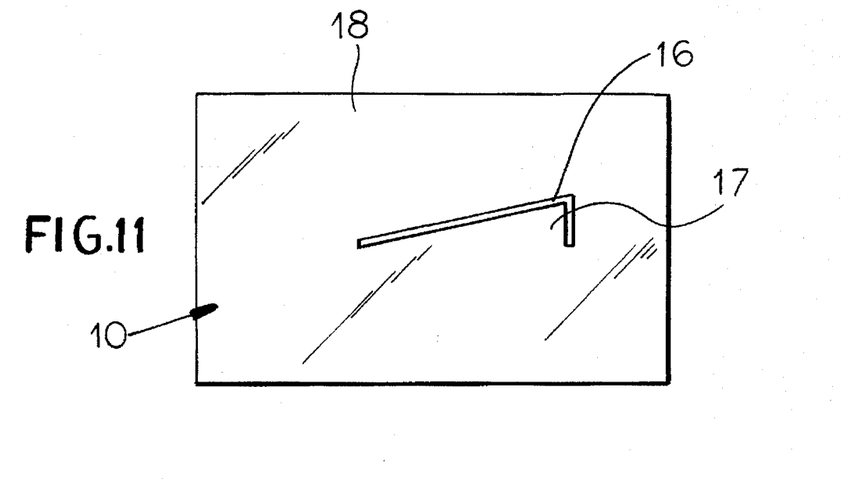
FIG. 11 is a plan view of a card with an internal tongue in jag and tooth form.

The embodiment illustrated in FIG. 11 differs from that shown in FIG. 9 by the feature that the tongue is tooth-shaped, the slit having only one angle.

Figure 12:
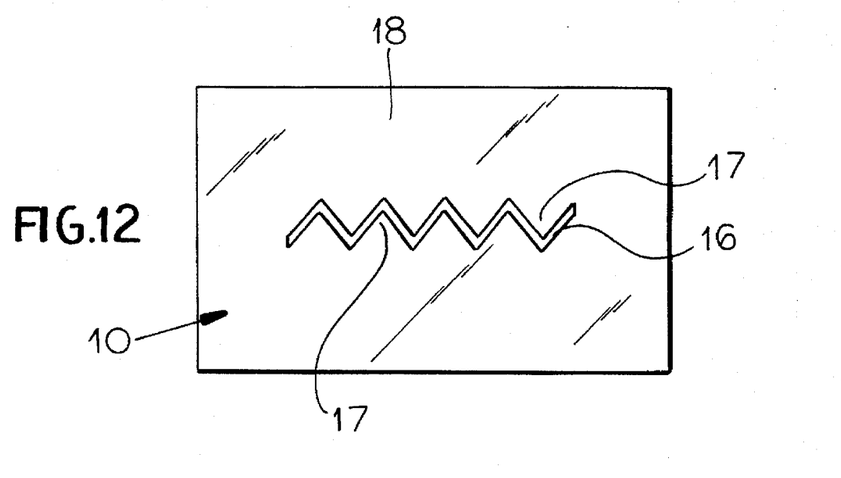
FIG. 12 is a plan view of a card with an internal row of teeth.
Figure 13:
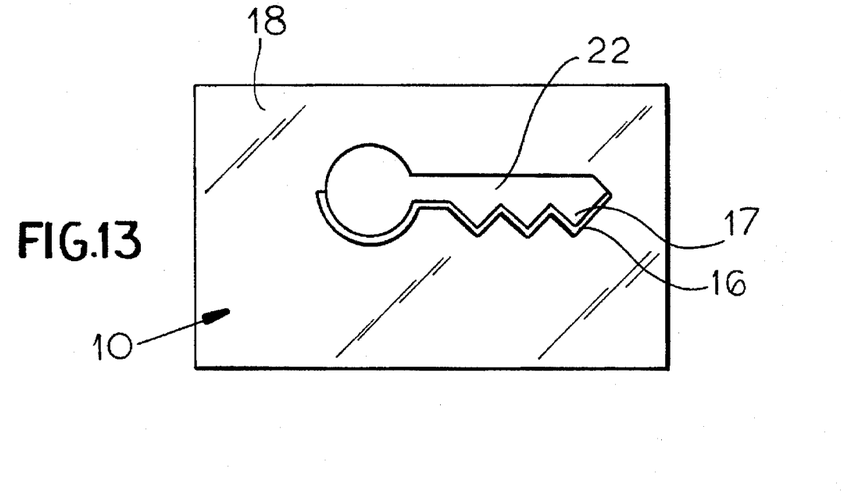
FIG. 13 is a plan view of a card with an internal row of teeth, in the configuration of a key.

The embodiment illustrated in FIG. 12 shows a zig-zag slot 16, so that a number of teeth can be formed by the card material on both sides of the slot. In the embodiment illustrated in FIG. 13 the zig-zag shape merges into the shape of a key image, so that the jags on one side form the bit of the key 22.

Figure 14:
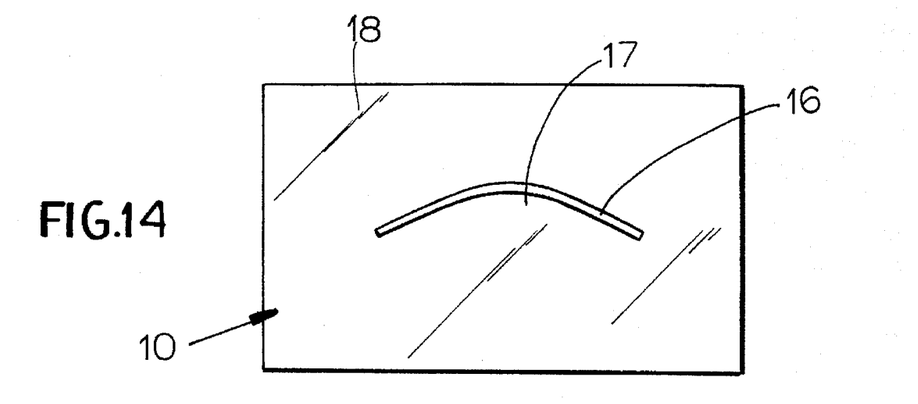
FIG. 14 is a plan view of a card with an internal surface zone having a singly arched edge.

In the embodiment illustrated in FIG. 14 the slot 16 is constructed arched, the result being a tongue or surface zone with an arcuate edge by means of which the lock can be actuated.

Figure 15:
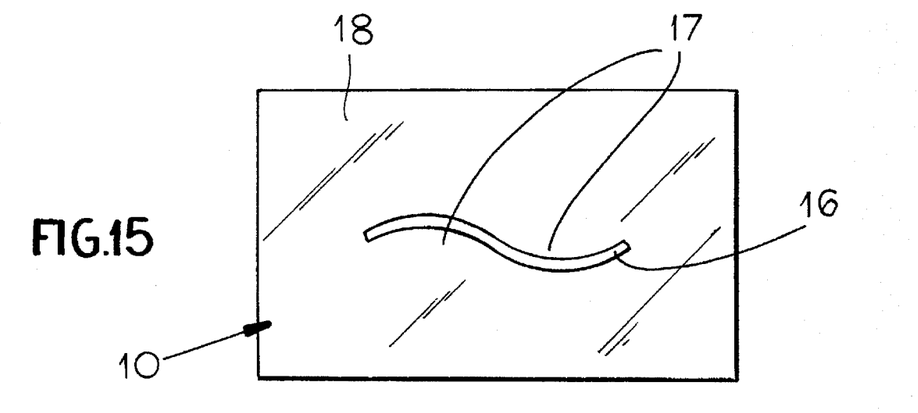
FIG. 15 is a plan view of a card with an internal surface zone having a double arched edge.

The embodiment illustrated in FIG. 15 differs from that shown in FIG. 14 solely by the feature that the slot has a double arching, forming two arcuate tongues on both sides.

In all the embodiments disclosed hereinbefore the card can in each case be used in two different manners. Either the or each tongue is bent outwards in relation to the card, or else the whole card—i.e., the remaining card zone 18 is bent—, so that then a tongue is not bent or less strongly bent, so that it projects out of the card surface, to actuate the lock with this projecting zone. In the embodiment illustrated in FIG. 16 a movable zone 21 is disposed inside the remaining card surface 18. The zone 21 can move springily—i.e., the circular edge of the zone 21 is deformed in such a manner that a springing device is formed which causes the zone 21 to spring forwards and back as soon as pressure is exerted on the zone 21 and it is again released. For the actuation of the zone 21 the lock contains an actuating member, more particularly a pin, lever end, knob or the like which presses an the card surface substantially at right angles thereto as soon as the card is pressed into the lock. The force for such inward pressure can be generated by the card pressing by its front edge on a lock element which projects into the path of the card, such force being transmitted to the actuating member. As soon as the zone 21 projects from the card surface, this zone actuates a feeler or lever or the like of the lock, to release the lock, as described hereinbefore, more particularly by means of intermediate members.

Figure 16:
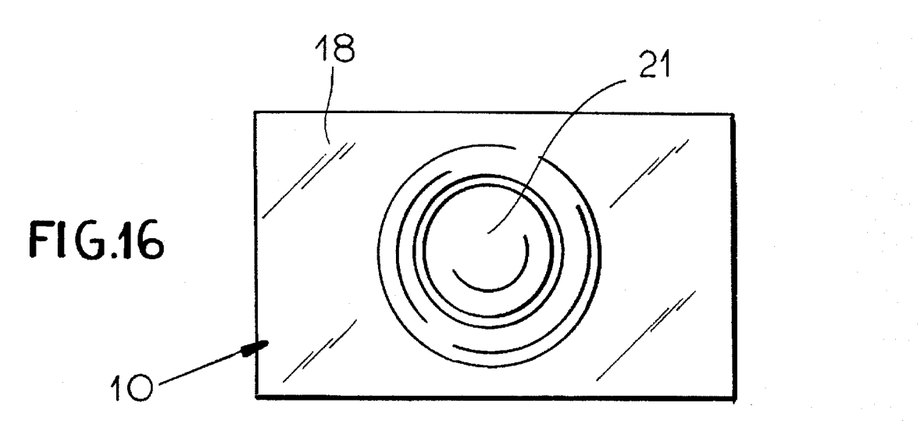
FIG. 16 is a plan view of a card with an internal surface zone which can move springily transversely of the card surface.
Figure 17:
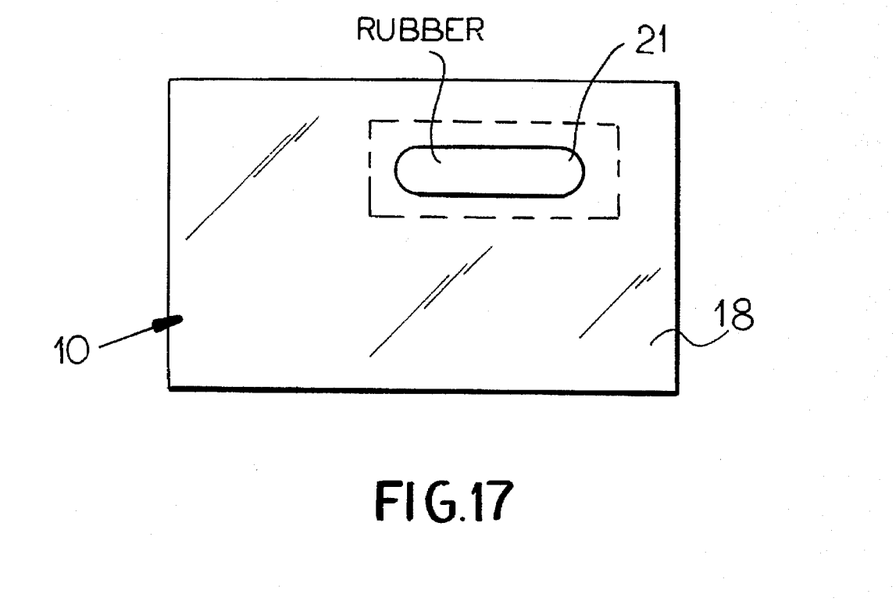
FIG. 17 is a plan view of a card with an internal surface zone consisting of a resilient material.

In the embodiment illustrated in FIG. 16, therefore, the zone 21 forms a resilient zone which can be disposed at any place on the card. As shown in FIG. 17 the resilient zone consists of an elastic surface, more particularly of rubber—i.e., a different material from that of the rest of the card is disposed in the zone 21.

Figure 18:
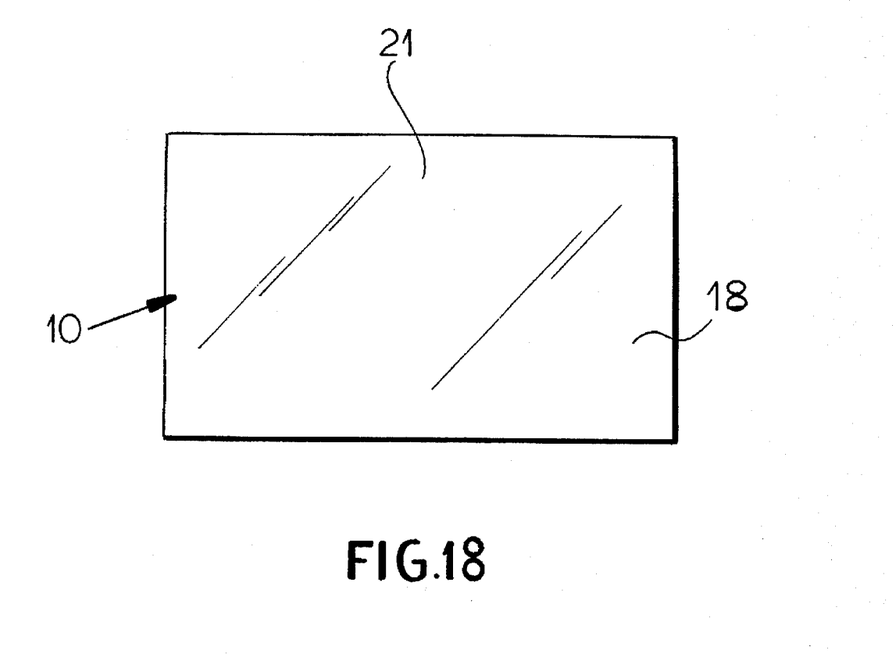
FIG. 18 is a plan view of a card with an internal surface zone which consists of a softer material than the remaining card surface.

The embodiment illustrated in FIG. 18 differs from that shown in FIG. 17 by the feature that the movable resilient zone 21 consists of a soft material, such as paperboard and/or paper. However, in this embodiment it is possible for the material of the zone 21 to be so soft that it can be pierced. To this end the lock has a needle-shaped or nail-shaped pin. Alternatively, the lock can punch through the zone 21 at the soft place. The instrument of the lock which produces such piercing or punching through therefore penetrates the surface of the card and therefore performs a movement which produces unlocking. In contrast, a card of hard and therefore non-pierceable or non-punchable material in the zone 21 cannot produce unlocking.

In all the embodiments a different effect can be produced by the deformed or undeformed surface area. Either said surface area by its deformation ensures the unlocking of the coupling member directly or utilizing intermediate members, or the surface area is merely used to ensure that only a card having a correct surface zone can be inserted in the lock and thereafter—i.e., after its insertability has been checked—the further insertion of the card causes unlocking. Not necessarily the surface must bring about unlocking, but some other part of the card, for example, another front zone of the card end (the front card edge) can bring about uncoupling.

The card can also have a magnetic strip 100 (FIG. 1) by which items of information can be stored using a read/write apparatus and/or called up, the apparatus being preferably disposed at the check-out or at the entrance/exit of a shop. The magnetic strip the card can perform additional functions. More particularly items of information concerning the customer, the trolley and/or goods can be obtained thereby.

The card can have an electronic chip and/or an integrated circuit IC (FIG. 3).

I claim:

1. A pledge-lock assembly comprising:
   a pledge-lock operating card having a relatively rigid portion and at least one deformable portion adjacent said rigid portion; and
   a pledge lock mounted on a cart, said pledge lock comprising:
   a housing provided with an opening for receiving said card,
   a lock mechanism in said housing actuatable by insertion of a card into said slot for release of a coupling member receivable in said housing and thereby releasing said cart, said mechanism including means for deforming the deformable portion to check validity of said card whereby said mechanism is actuated by one of said portions only upon deformation of said deformable portion, and
   means in said housing for retaining said card in said housing until another insertion of a coupling member into said housing releases said card and retains said cart.

2. The pledge-lock assembly defined in claim 1 further comprising a recess between said rigid portion and said deformable portion facilitating deformation of said deformable portion.

3. The pledge-lock assembly defined in claim 2 wherein said recess is a slot.

4. The pledge-lock assembly defined in claim 2 wherein said recess is provided at an edge of the card.

5. The pledge-lock assembly defined in claim 1 wherein said deformable portion has the shape of a tongue separated from said rigid portion by at least one slot.

6. The pledge-lock assembly defined in claim 5 wherein the slot extends in a direction of insertion of said card into said opening.

7. The pledge-lock assembly defined in claim 6 wherein said card has a pair of slots each separating a respective deformable tongue from a central zone forming said rigid portion.

8. The pledge-lock assembly defined in claim 7 wherein said central zone has a greater width than each of said tongues.

9. The pledge-lock assembly defined in claim 1 wherein a slot separates said deformable portion from said rigid portion and has an edge formed with at least one tooth.

10. The pledge-lock assembly defined in claim 9 wherein said slot is zig-zag-shaped.

11. The pledge-lock assembly defined in claim 1 wherein said deformable position is composed of a material less dense than that of said rigid portion.

12. The pledge-lock assembly defined in claim 1 wherein said deformable portion is composed of a softer material than said rigid portion.

13. The pledge-lock assembly defined in claim 1 wherein said deformable section has a smaller thickness than said rigid portion.

14. The pledge-lock assembly defined in claim 1 wherein said card has a magnetic strip carrying information.

15. The pledge-lock assembly defined in claim 1 wherein said card is formed with an electronic chip.

16. The pledge-lock assembly defined in claim 1 wherein said card is formed with an integrated circuit.

* * * * *